United States Patent
Aiki et al.

(10) Patent No.: US 8,294,322 B2
(45) Date of Patent: Oct. 23, 2012

(54) ROTATING ELECTRICAL MACHINE

(75) Inventors: Kosuke Aiki, Aichi-gun (JP); Hideo Nakai, Nisshin (JP); Takaji Umeno, Nisshin (JP); Eiji Yamada, Owariasahi (JP); Kazutaka Tatematsu, Nagoya (JP); Norimoto Minoshima, Kariya (JP); Toshihiko Yoshida, Kariya (JP); Tatsuya Uematsu, Kariya (JP); Kenji Endo, Kariya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 214 days.

(21) Appl. No.: 12/934,962

(22) PCT Filed: Mar. 12, 2009

(86) PCT No.: PCT/JP2009/054785
§ 371 (c)(1),
(2), (4) Date: Sep. 27, 2010

(87) PCT Pub. No.: WO2009/119333
PCT Pub. Date: Oct. 1, 2009

(65) Prior Publication Data
US 2011/0025158 A1    Feb. 3, 2011

(30) Foreign Application Priority Data
Mar. 28, 2008  (JP) ................. 2008-087553

(51) Int. Cl.
*H02K 3/28* (2006.01)
*H02K 16/04* (2006.01)
*H02K 17/02* (2006.01)
*H02K 21/24* (2006.01)

(52) U.S. Cl. ........ 310/184; 310/185; 310/265; 310/266; 310/268

(58) Field of Classification Search .......... 310/179–180, 310/184, 185, 265–268
See application file for complete search history.

(56) References Cited

U.S. PATENT DOCUMENTS
3,784,850 A * 1/1974 Inaba et al. ................ 310/49.23
(Continued)

FOREIGN PATENT DOCUMENTS
JP    2228234 A    9/1990
(Continued)

OTHER PUBLICATIONS
International Search Report for PCT/JP2009/054785, dated May 12, 2009.

*Primary Examiner* — Tran Nguyen
(74) *Attorney, Agent, or Firm* — Sughrue Mion, PLLC

(57) ABSTRACT

In a rotating electrical machine, when a stator winding is wound in concentrated winding, an improvement in performance is achieved by reducing a magnetomotive force harmonic without reducing a fundamental wave magnetic flux generated by a stator. A rotating electrical machine (10) includes a rotor (18), and two stators (14, 16) opposed with the rotor (18) being interposed therebetween either on both sides of the rotor (18) in the axial direction or on both sides of the rotor (18) in the radial direction. Stator windings (22) provided in a plurality of portions in the circumferential direction of each stator (14, 16) are wound in concentrated winding. The directions of magnetic fluxes generated by stator windings (22) having the same phase in the stators (14, 16) are in mutually opposite directions with respect to either the axial direction or the radial direction. The stator windings (22) having the same phase in the stators (14, 16) are arranged to be shifted from each other by 180 degrees in electrical angle in the circumferential direction.

6 Claims, 9 Drawing Sheets

U.S. PATENT DOCUMENTS

| | | | |
|---|---|---|---|
| 4,081,726 A * | 3/1978 | Brimer et al. | 318/751 |
| 4,996,457 A * | 2/1991 | Hawsey et al. | 310/268 |
| 5,619,087 A * | 4/1997 | Sakai | 310/268 |
| 5,892,307 A * | 4/1999 | Pavlovich et al. | 310/68 B |
| 6,005,320 A * | 12/1999 | Kim et al. | 310/156.36 |
| 6,166,471 A | 12/2000 | Kometani et al. | |
| 6,750,588 B1 * | 6/2004 | Gabrys | 310/268 |
| 6,809,453 B2 | 10/2004 | Narita et al. | |
| 6,815,863 B1 | 11/2004 | Jack et al. | |
| 7,642,685 B2 | 1/2010 | Nakayama et al. | |
| 7,679,260 B2 * | 3/2010 | Yamamoto et al. | 310/268 |
| 2002/0171324 A1 * | 11/2002 | Smith et al. | 310/268 |

FOREIGN PATENT DOCUMENTS

| | | |
|---|---|---|
| JP | 4-97459 A | 8/1992 |
| JP | 7-298578 A | 11/1995 |
| JP | 2002-512499 A | 4/2002 |
| JP | 2004-056860 A | 2/2004 |
| JP | 2005-237086 A | 9/2005 |
| JP | 2005-287093 A | 10/2005 |
| JP | 2006-271187 A | 10/2006 |
| JP | 2007-202333 A | 8/2007 |
| WO | 99/54985 A1 | 10/1999 |

* cited by examiner

ROTATING ELECTRICAL MACHINE

TECHNICAL FIELD

The present invention relates to a rotating electrical machine having one rotor and two stators.

BACKGROUND ART

Heretofore, stator windings of a distributed winding type or of a concentrated winding type have been considered for rotating electrical machines such as induction motors and synchronous motors. Of these two types, the concentrated winding type is advantageous in that the winding is simpler, the coil end portion can be made smaller, and the ease of mass production can be increased, as compared with the distributed winding type. However, the concentrated winding type suffers in that it is possible that a magnetomotive force harmonic having a frequency close to the fundamental wave may occur in a magnetomotive force waveform, which results in occurrence of torque pulsation (ripple) or a diminished power factor.

For example, FIG. 9 shows a relationship of flux linkage originating from a stator and linked to a rotor with respect to time for an example case in which the stator winding, which is an armature winding of a conventional induction motor, is wound in concentrated winding. Further, FIG. 10 shows a relationship of an induced current occurring in a rotor winding on the side of the rotor, which is a secondary side conductor, corresponding to the flux linkage shown in FIG. 9, with respect to time. As is clear from FIG. 9 and FIG. 10, a spacial harmonic magnetic flux unique to a case wherein a concentrated winding type stator is used is linked to the rotor winding. In other words, the distribution of a magnetomotive force causing a stator to generate a rotating magnetic field does not form a sinusoidal distribution consisting only of a fundamental wave, but includes a harmonic component due to the arrangement of the stator windings of respective phases or the shape of the stator. Particularly, when the stator windings are wound in concentrated winding around teeth on the stator side, the amplitude of a harmonic component occurring in a magnetomotive force distribution of the stator will increase.

A magnetic flux including such a harmonic component due to the arrangement of the stator windings or the shape of the stator is referred to as a spacial harmonic magnetic flux. A harmonic current which is an induced current including a harmonic component as shown in FIG. 10 occurs in the rotor winding to which a spacial harmonic magnetic flux is linked. The harmonic current causes an increase in secondary conductor loss such as secondary copper loss, and deterioration in performance of the motor.

Against this background, Japanese patent publication JP 2006-271187 A (Patent Document 1) discloses a rotating electrical machine comprising a stator in which a coil is wound around a plurality of teeth provided on a stator core in concentrated winding, and the coil is connected to a three-phase power supply; and a rotor disposed to be opposed to the stator, wherein a ratio between the number of poles and the number of slots of the stator is 1:3. Patent Document 1 further describes that there is no magnetomotive force harmonic of an order close to the fundamental wave. In addition to Patent Document 1, prior art documents relevant to the present invention include Japanese patent publications JP 2005-237086 A (Patent Document 2) and JP 2004-56860 A (Patent Document 3).

Patent Document 1: JP 2006-271187 A
Patent Document 2: JP 2005-237086 A
Patent Document 3: JP 2004-56860 A

DISCLOSURE OF THE INVENTION

Problems to be Solved by the Invention

However, in the rotating electrical machine described in Patent Document 1, in order to increase the number of windings wound around the teeth of the stator from three to six per pole pair, the width of each pole is reduced to half to allow the number of windings to be increased. Therefore, although there is a possibility that a magnetomotive force harmonic can be reduced, a fundamental wave magnetic flux will also be reduced. As such, a further improvement is desired in terms of achieving an improved performance of a rotating electrical machine by reducing a magnetomotive force harmonic without reducing a fundamental wave magnetic flux.

Patent Document 2 describes an axial motor wherein a stator is interposed between two rotors, the rotors and the stator being arranged to be opposed in the axial direction, for the purpose of achieving improvement in efficiency and output. A rotor main body composed of a conductive metal that forms each rotor has an embedment portion for embedding a rotor magnetic core on a surface opposed to the stator. By using the embedment portion as a shaping mold, a rotor magnetic core formed using a pressed powder magnetic core material is embedded in the embedment portion. For such an axial motor as described in Patent Document 2, it has not been considered that, when the stator winding is wound in concentrated winding, performance of a rotating electrical machine is improved by reducing a magnetomotive force harmonic without reducing a fundamental wave magnetic flux generated by the stator.

FIG. 14 of Patent Document 3 shows an induction motor having two stators and one rotor. In this induction motor, the rotor is arranged between the two stators, and the two stators and the rotor are opposed in the axial direction. The rotor has tooth portions fitted in a plurality of holes provided in a disk portion formed of a conductive material. With this configuration, opposed windings of the two stators generate magnetic fluxes in the same direction, and the opposed windings are configured to form different poles with respect to the rotor. However, for such an induction motor, it has not been considered that the winding is wound in concentrated winding such that, among teeth provided in a plurality of portions in the circumferential direction of a stator, windings of different phases are wound around teeth adjacent in the circumferential direction. As such, when the stator winding is wound in concentrated winding, a further improvement is desired in terms of achieving an improved performance of a rotating electrical machine by reducing a magnetomotive force harmonic without reducing a fundamental wave magnetic flux generated by the stator. It should be noted that the above-described disadvantage occurs not only when a rotating electrical machine is configured in the form of an induction motor, but also similarly occurs when a rotating electrical machine is configured in the form of a synchronous motor. Specifically, in a synchronous motor, when a harmonic magnetic flux is included in a magnetic flux linked from a stator to a rotor, an increase in magnetic flux leakage or iron loss occurs due to the harmonic magnetic flux, and causes the performance of the motor to deteriorate.

An object of the present invention is to achieve improvement in performance by reducing a magnetomotive force harmonic without reducing a fundamental wave magnetic flux generated by a stator when the stator winding is wound in concentrated winding in a rotating electrical machine.

Means for Solving the Problems

According to the present invention, there is provided a rotating electrical machine comprising one rotor; and two stators opposed with the rotor being interposed therebetween either on both sides of the rotor in an axial direction or on both sides of the rotor in a radial direction, wherein each stator has teeth provided in a plurality of portions in a circumferential direction, and stator windings which are primary conductors wound around the teeth, the stator windings are wound in concentrated winding, in which windings of different phases are wound around teeth adjacent in the circumferential direction in the plurality of teeth, directions of magnetic fluxes generated by stator windings having a same phase in the two stators are in mutually opposite directions with respect to either the axial direction or the radial direction, and the stator windings having the same phase in the two stators are arranged to be shifted from each other by 180 degrees in electrical angle in the circumferential direction.

Further, in the rotating electrical machine according to the present invention, it is preferable that a secondary conductor is provided in at least a portion of the rotor, and the rotating electrical machine is usable as an induction machine.

Further, in the rotating electrical machine according to the present invention, it is preferable that the rotor has a conductive body formed of a conductive material, which is a secondary conductor, and cores formed of a magnetic material provided in a plurality of portions in the circumferential direction of the conductive body.

Further, in the rotating electrical machine according to the present invention, it is preferable that an entire length of the conductive body in the axial direction is either same as an entire length of the cores in the axial direction, or greater than the entire length of the cores in the axial direction.

Further, in the rotating electrical machine according to the present invention, it is preferable that the cores formed of the magnetic material are provided throughout the entire length of the conductive body in the axial direction, in hole portions provided in a plurality of portions in the circumferential direction of the conductive body to pierce the conductive body in the axial direction.

Further, in the rotating electrical machine according to the present invention, it is preferable that the rotor has permanent magnets provided in a plurality of portions in the circumferential direction, and the rotating electrical machine is usable as a synchronous machine.

Advantages of the Invention

By employing a rotating electrical machine according to the present invention, a rotor is interposed between two stators, each stator having a stator winding wound in concentrated winding, and spacial harmonic magnetic fluxes generated by the two stators can be made to compensate each other at the rotor. As a result, it is possible to suppress occurrence of a harmonic current in an induced current produced in the rotor, and, in addition, because the width of each stator winding with respect to the circumferential direction of each stator is not reduced, fundamental wave magnetic fluxes generated by the stators are not reduced. Therefore, when the stator winding is wound in concentrated winding, by reducing a magnetomotive force harmonic without reducing a fundamental wave magnetic flux generated by the stators, it is possible to significantly reduce secondary conductor loss such as secondary copper loss on the rotor side, or reduce loss such as magnetic flux leakage or iron loss caused by spatial harmonic magnetic flux on the rotor side, and, as a result, the performance of a rotating electrical machine can be significantly improved. Further, because a rotor is interposed between two stators either in the axial direction or in the radial direction, adjustment of the amount of magnetic flux flowing from the stators to the rotor can be easy.

Figure 1:
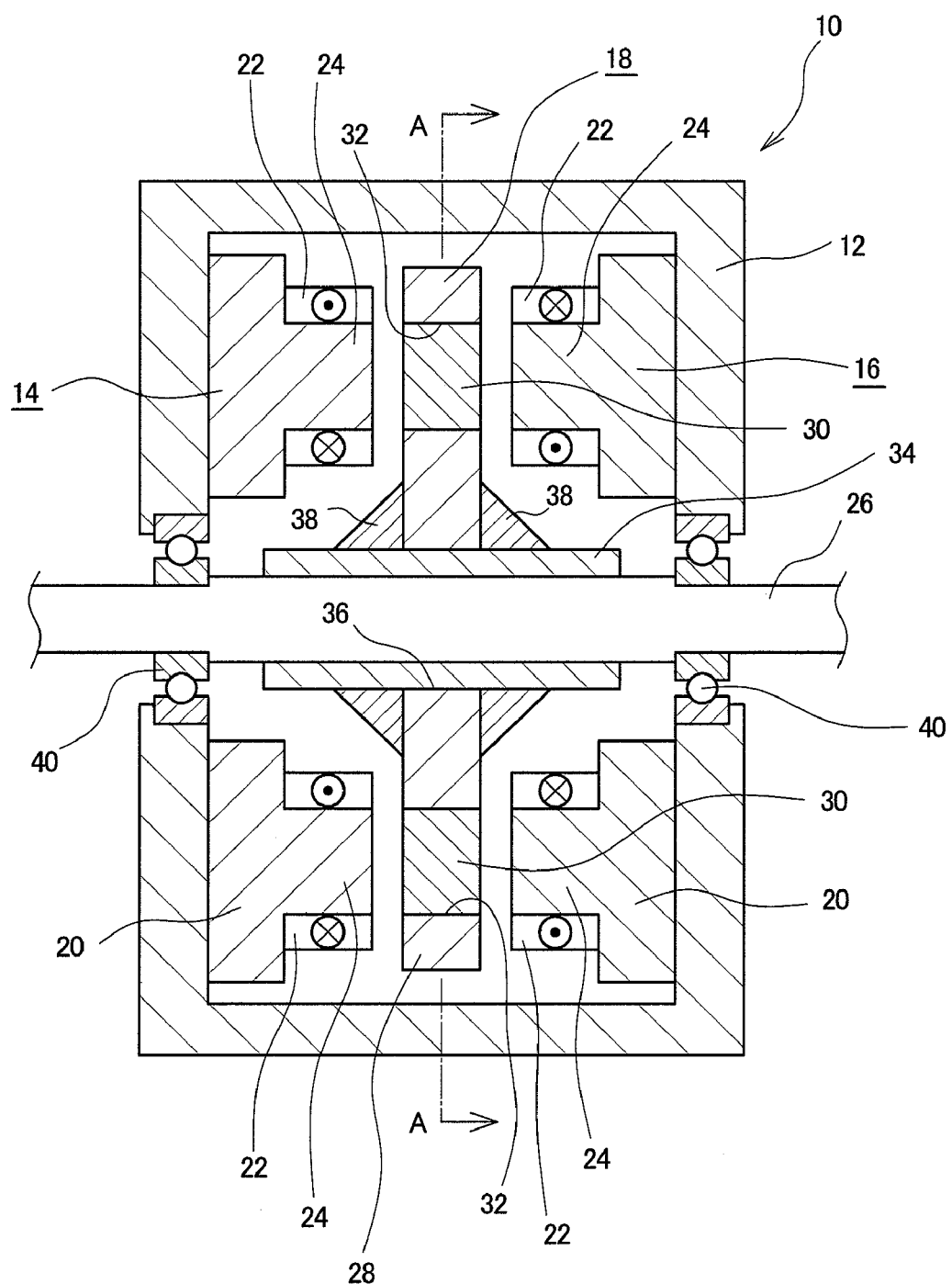
FIG. 1 is a schematic cross-sectional view showing a rotating electrical machine according to a first embodiment of the present invention.

REFERENCE NUMERALS 10, 10a, 10b ROTATING ELECTRICAL MACHINE
12 CASING
14 FIRST STATOR
16 SECOND STATOR
18, 18a, 18b ROTOR
20 STATOR CORE
22 STATOR WINDING
24 TOOTH
26 ROTATING SHAFT
28 ROTOR CONDUCTIVE BODY
30 ROTOR CORE
32 EMBEDDING HOLE PORTION
34 TUBE PORTION
36 HOLE PORTION
38 RETAINING MEMBER

40 BEARING
42 ROTOR CORE
44 PERMANENT MAGNET
46 OUTER STATOR
48 INNER STATOR
50, 52 STATOR CORE
54 STATOR WINDING
56, 58 TOOTH
60 ROTOR CONDUCTIVE BODY
61 TUBE PORTION
62 ROTOR CORE
64 BASE PORTION
66 HOLE PORTION

BEST MODE FOR CARRYING OUT THE INVENTION

First Embodiment of the Invention

Figure 2:
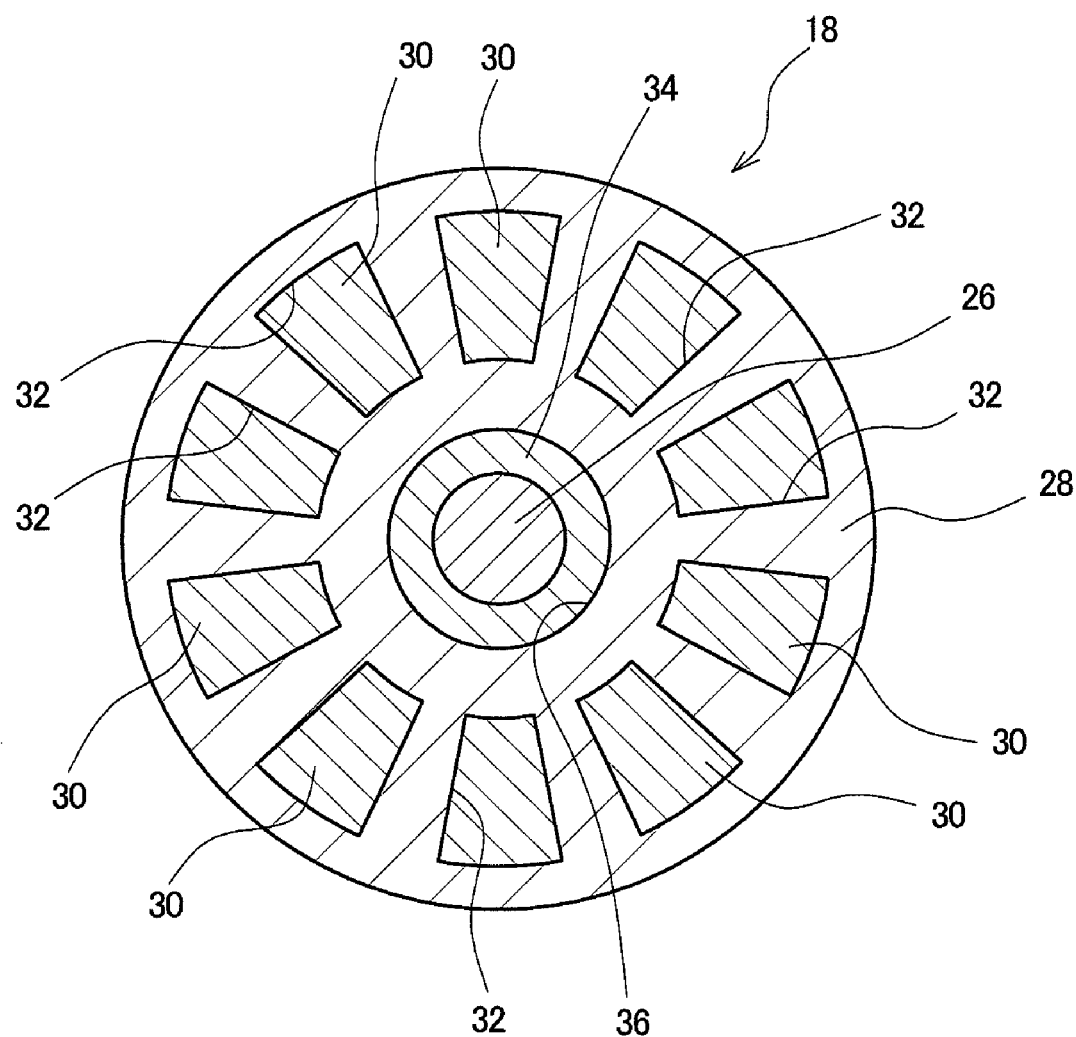
FIG. 2 is a schematic cross-sectional view along A-A shown in FIG. 1.
Figure 3:
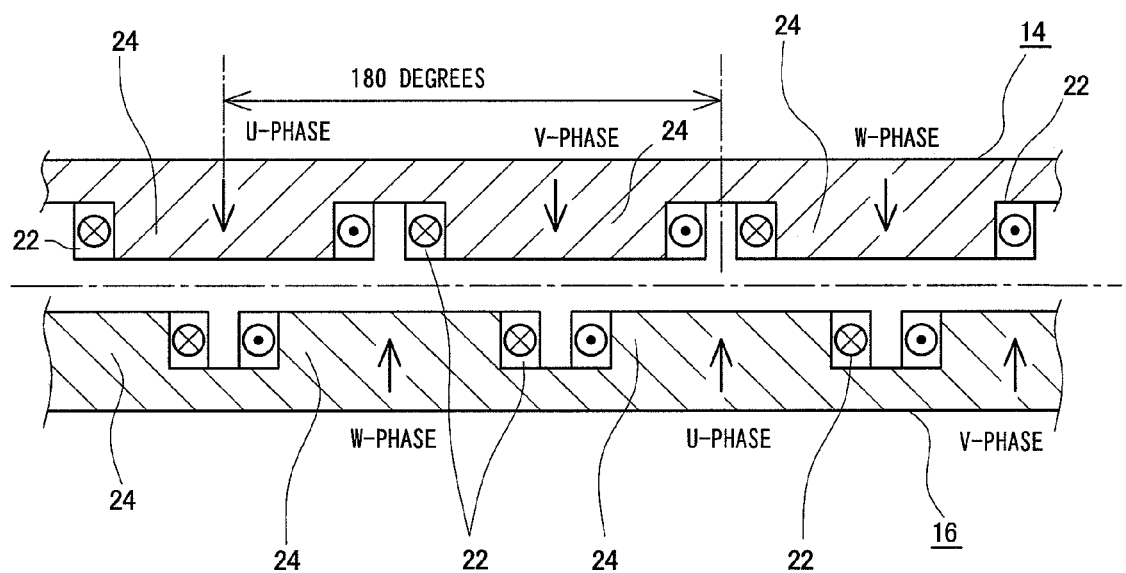
FIG. 3 shows a portion in the circumferential direction of the stators, in which the portion in the circumferential direction is laid out in the lateral direction, for explaining a state in which stator windings having the same phase in a first stator and a second stator of FIG. 1 are shifted from each other in electrical angle.
Figure 4:
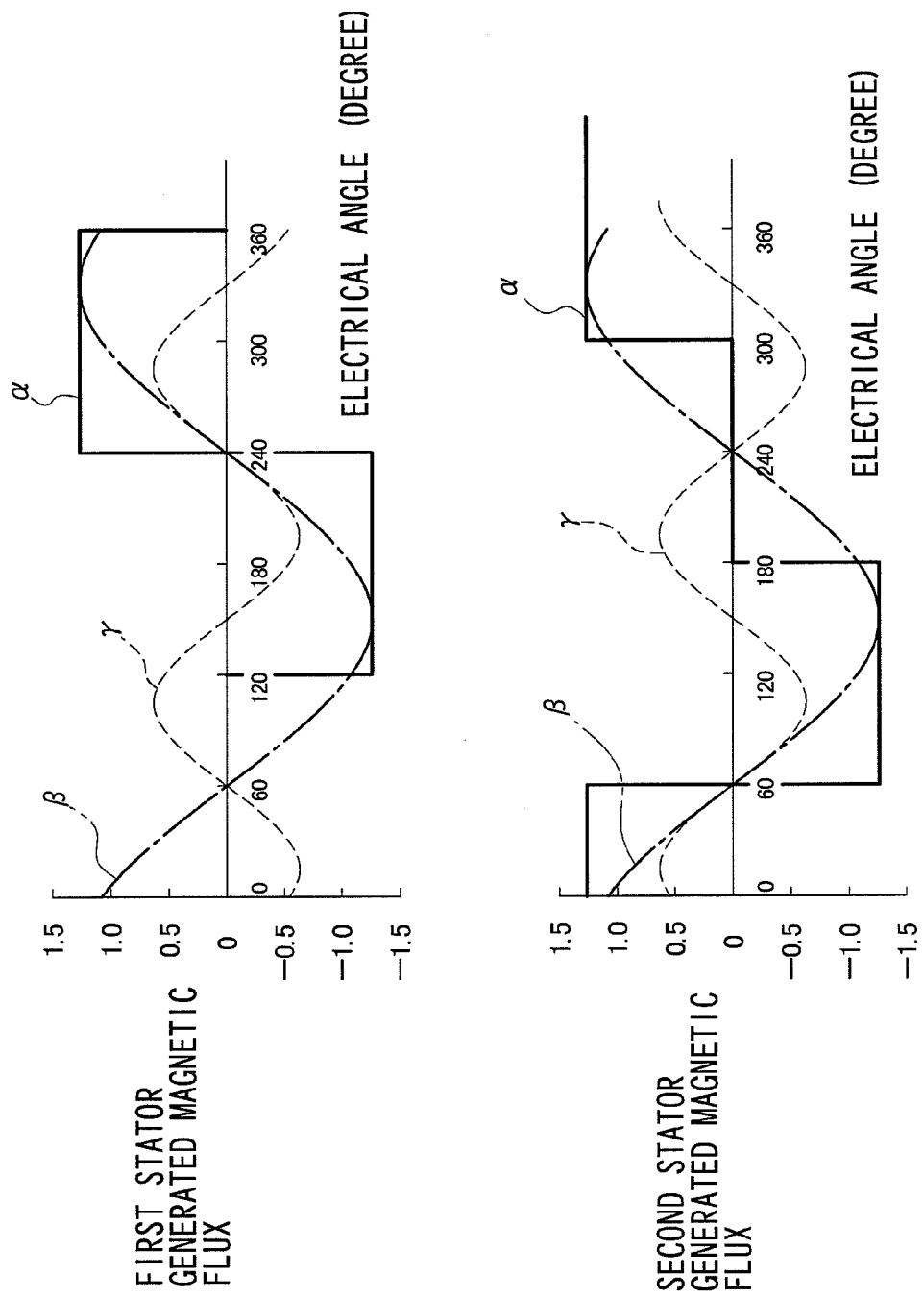
FIG. 4 shows distributions of magnetic fluxes generated in the first stator and the second stator of FIG. 1.
Figure 5:
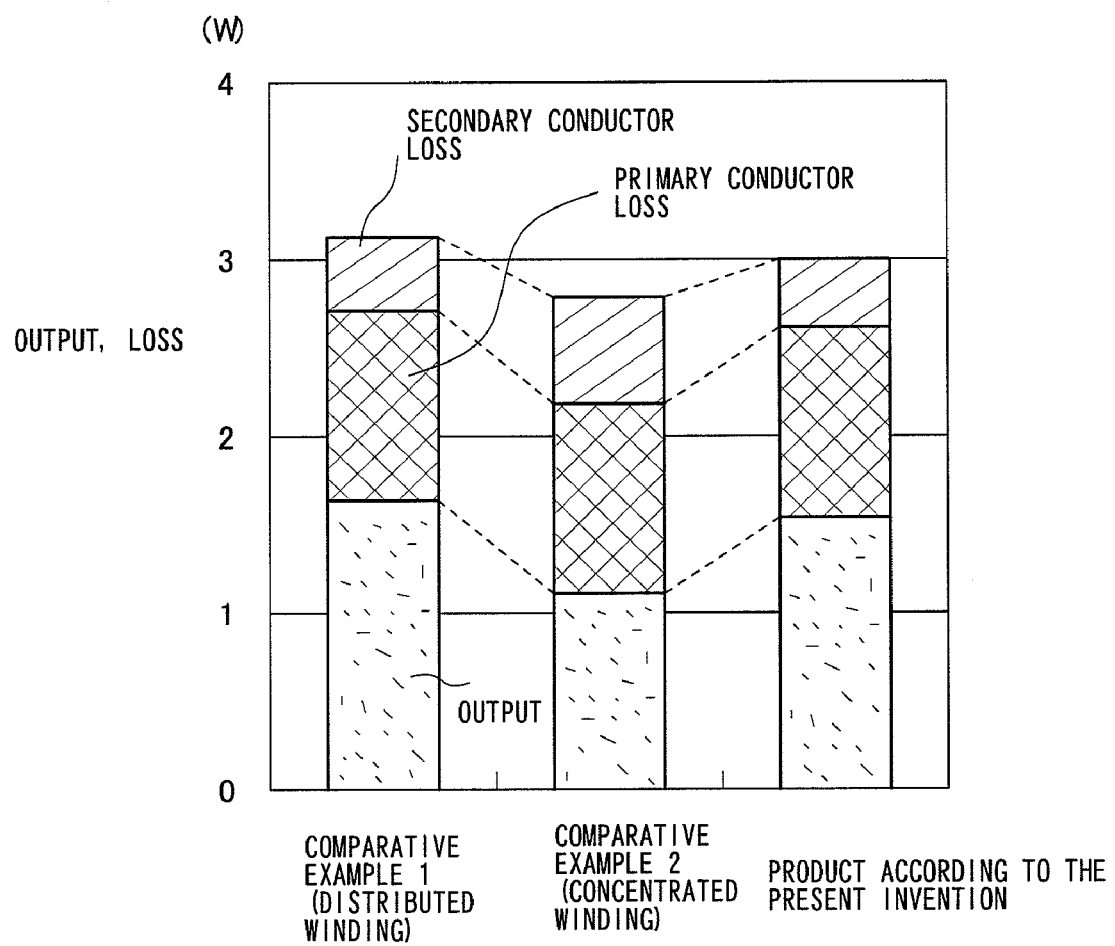
FIG. 5 shows comparisons of outputs and losses at a constant slip time of a rotating electrical machine among a Comparative Example 1 in which the stator winding is wound in distributed winding, a Comparative Example 2 in which the stator winding is wound in concentrated winding, and a product according to the present invention having the structure of the first embodiment.
Figure 6:
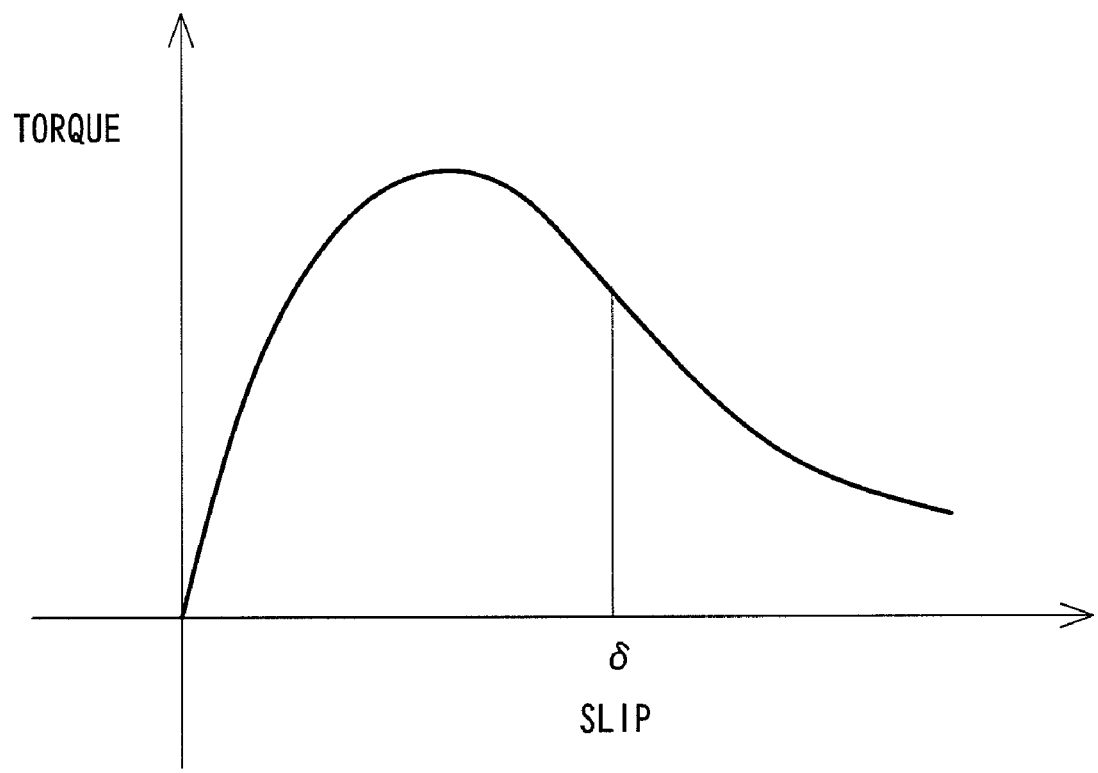
FIG. 6 shows one example of a relationship between a slip and a torque of a rotating electrical machine for explaining the constant slip time.

Embodiments of the present invention will be described below with reference to the drawings. FIG. 1 to FIG. 6 show a first embodiment of the present invention. FIG. 1 is a schematic cross-sectional view showing a rotating electrical machine according to the first embodiment. FIG. 2 is a schematic cross-sectional view along A-A of FIG. 1. FIG. 3 shows a portion in the circumferential direction of the stators, in which the portion in the circumferential direction is laid out in the lateral direction, for explaining a state in which stator windings having the same phase in a first stator and a second stator of FIG. 1 are shifted from each other in electrical angle. FIG. 4 shows distributions of magnetic fluxes generated in the first stator and the second stator of FIG. 1. FIG. 5 shows comparisons of outputs and losses at a constant slip time of a rotating electrical machine among a Comparative Example 1 in which the stator winding is wound in distributed winding, a Comparative Example 2 in which the stator winding is wound in concentrated winding, and a product according to the present invention having the structure of the first embodiment. FIG. 6 shows one example of a relationship between a slip and a torque of a rotating electrical machine for explaining the constant slip time.

As shown in FIG. 1, a rotating electrical machine 10 according to the present embodiment is configured to be usable as an induction motor, which is an induction machine, and includes two stators, a first stator 14 and a second stator 16, which are attached to a casing 12, and one rotor 18 which is arranged to be opposed to the stators 14 and 16 in the axial direction with a predetermined gap being provided between the stators 14 and 16, the rotor 18 being rotatable with respect to the stators 14 and 16. In other words, the rotating electrical machine 10 includes one rotor 18 and two stators 14 and 16 opposed on both sides of the one rotor 18 in the axial direction with the rotor 18 being interposed therebetween. FIG. 1 shows an example of an axial-type rotating electrical machine, in which the stators 14 and 16 and the rotor 18 are arranged to be opposed in the axial direction.

Each of the stators 14 and 16 includes a stator core 20 formed by, for example, layering a plurality of magnetic steel sheets, and stator windings 22 having a plurality of phases, or three phases of U-phase, V-phase, and W-phase. The stator windings 22 are primary conductors. Teeth 24 are provided at evenly spaced positions in a plurality of portions in the circumferential direction on surfaces on one side in the axial direction on which the stator cores 20 are opposed to each other, such that the teeth 24 protrude in the axial direction. For example, in order to provide a plurality of teeth 24 on each stator core 20, it is possible to form hole portions in the axial direction in a plurality of portions in the circumferential direction of the stator core 20, and insert tooth components formed of a magnetic material such as a steel sheet into the hole portions, so that a plurality of teeth 24 can be formed by portions of the tooth components which are protruded from a surface on one side of the stator core 20.

The stator windings 22 are wound around the teeth 24. The stator windings 22 are wound in concentrated winding, in which windings of different phases are wound around teeth 24 adjacent in the circumferential direction in the plurality of teeth 24. Further, in FIG. 1, symbols having a dot or a cross in circles shown within the stator windings 22 denote directions of currents flowing in the stator windings 22, and, specifically, the one having a dot in a circle indicates that a current flows frontward in the drawing, and the one having a cross in a circle indicates that a current flows backward in the drawing (the same symbols are similarly used in FIG. 3, FIG. 7, and FIG. 8 which will be described later).

Further, as shown in FIG. 2, the rotor 18 has a disk-shaped rotor conductive body 28, which is attached on outer side in radial direction in a middle portion in the axial direction of a rotating shaft 26, and rotor cores 30 formed of a magnetic material provided at evenly spaced positions in a plurality of portions in the circumferential direction of the rotor conductive body 28. In the rotor conductive body 28, by performing press work to punch a disk-shaped conductive material formed of, for example, copper or aluminum, embedding hole portions 32 are provided in a plurality of portions in the circumferential direction to pierce the rotor conductive body in the axial direction (in the frontward and backward direction in FIG. 2), and a hole portion 36 for allowing insertion of the rotating shaft 26 and a tube portion 34, which will be described later, is formed in a center portion of the rotor conductive body 28. Then, by embedding magnetic materials such as layered steel sheets or pressed powder magnetic cores in the plurality of embedding hole portions 32 formed in the rotor conductive body 28, the rotor cores 30 are provided in a plurality of portions in the circumferential direction of the rotor conductive body 28 throughout the length of the rotor conductive body 28 in the axial direction. The rotor 18 is thus formed. The rotor conductive body 28 is a secondary conductor, and has a function similar to that of a rotor winding for a case where rotor windings are provided in a plurality of portions in the circumferential direction of the rotor 18. The rotor conductive body 28 is provided throughout the length of the rotor 18 in the axial direction. In other words, the entire length of the rotor conductive body 28 in the axial direction is either same as the entire length of the rotor cores 30 in the axial direction, or greater than the entire length of the rotor cores 30 in the axial direction.

Further, the rotor conductive body 28 may also be formed by layering a plurality of disk-shaped sheet elements in which embedding hole portions are formed in a plurality of portions in the circumferential direction through press-work punching.

Returning to FIG. 1, such a rotor 18 is attached on outer side in radial direction in a middle portion in the axial direction of the rotating shaft 26 with a cylindrical tube portion 34 being interposed therebetween. Partially conical retaining members 38 are attached on both sides of the rotor 18 in the axial direction on outer side in radial direction of the tube portion 34, and the rotor 18 is pinched between the retaining members 38 on both sides in the axial direction. Alternatively, instead of the retaining members 38, by attaching flat or otherwise shaped reinforcing members on a plurality of portions in the circumferential direction between the tube portion 34 and the rotor 18 on both sides of the rotor 18 in the axial direction, the rotor 18 may be pinched between the reinforcing members on both sides in the axial direction. Further, the rotor 18 may be attached directly on outer side in radial direction of the rotating shaft 26 without a tube portion 34 being interposed therebetween. Still further, a pair of bearings 40 are provided between two positions apart from each other in the axial direction of the rotating shaft 26 and openings provided at two positions in the casing 12, so that the rotating shaft 26 is rotatably supported to the casing 12.

Further, as shown in FIG. 3, for the first stator 14 and the second stator 16 provided on both sides of the rotor 18 in the axial direction, the directions of magnetic fluxes generated by the stator windings 22 having the same phase in the stators 14 and 16 are in mutually opposite directions with respect to the vertical direction in FIG. 3, which is the axial direction, or, more specifically, either in opposing directions as shown in FIG. 3, or in outward directions. In FIG. 3, the directions of the arrows shown within the teeth 24 represent the directions of magnetic fluxes originating from the teeth 24 provided in a portion of the stators 14 and 16 in the circumferential direction. Further, the rotor 18 is arranged between the first stator 14 and the second stator 16 in an actual application, but is not shown in FIG. 3. Still further, the circumferential direction of the stators 14 and 16 is in the lateral direction in FIG. 3. As shown in FIG. 3, the stator windings 22 having the same phase in the first stator 14 and the second stator 16 are arranged to be shifted from each other by 180 degrees in electrical angle in the circumferential direction. Further, for the two stators 14 and 16 shown in FIG. 1, the arrangement relationship of the stator windings 22 with respect to the circumferential direction does not represent an actual relationship, and, in an actual application, the positions of the stator windings 22 with respect to the circumferential direction in the two stators 14 and 16 are shifted as shown in FIG. 3.

Such a rotating electrical machine 10 is driven to rotate, in a manner as will be described below. By causing a three-phase alternating current to flow through the three-phase stator windings 22, the rotating magnetic fields produced by the stators 14 and 16 act on the rotor 18, and then, induced currents flow through the rotor conductive body 28 in a plurality of portions in the circumferential direction of the rotor 18 which surround the rotor cores 30. The induced currents cause an electromagnetic force to occur in the rotor 18, and the rotor 18 is driven to rotate in the same direction as the rotating magnetic fields of the stators 14 and 16.

Further, in the rotating electrical machine 10 according to the present embodiment, two stators 14 and 16 are provided on both sides of one rotor 18 in the axial direction to be opposed with the rotor 18 being interposed therebetween, the stators 14 and 16 have teeth 24 provided in a plurality of portions in the circumferential direction and stator windings 22 wound around the teeth 24, the stator windings 22 are wound in concentrated winding, in which windings of different phases are wound around teeth 24 adjacent in the circumferential direction in the plurality of teeth 24, the directions of magnetic fluxes generated by the stator windings 22 having the same phase in the two stators 14 and 16 are in mutually opposite directions with respect to the axial direction, and the stator windings 22 having the same phase in the two stators 14 and 16 are arranged to be shifted from each other by 180 degrees in electrical angle in the circumferential direction. As a result, the rotor 18 is interposed between the two stators 14 and 16 each having the stator windings 22 wound in concentrated winding, and spacial harmonic magnetic fluxes generated by the two stators 14 and 16 can be made to compensate each other at the rotor 18. As a result, it is possible to suppress occurrence of a harmonic current in an induced current produced in the rotor 18, and, in addition, because the width of each stator winding 22 with respect to the circumferential direction of the stators 14 and 16 is not reduced, fundamental wave magnetic fluxes generated by the stators 14 and 16 are not reduced. Therefore, when the stator windings 22 are wound in concentrated winding, by reducing a magnetomotive force harmonic without reducing a fundamental wave magnetic flux generated by the stators 14 and 16, it is possible to significantly reduce secondary conductor loss such as secondary copper loss on the rotor 18 side, and, as a result, the performance of the rotating electrical machine 10 can be significantly improved. Further, because the rotor 18 is interposed between the two stators 14 and 16 in the axial direction, adjustment of the amount of magnetic flux flowing from the stators 14 and 16 to the rotor 18 can be easy.

FIG. 4 shows relative distributions of magnetic fluxes generated in the first stator 14 (FIG. 1 and FIG. 3) and the second stator 16 (FIG. 1 and FIG. 3) which are opposed to each other. In the following description of the present embodiment, components identical to the components shown in FIG. 1 to FIG. 3 are denoted using the same reference numerals. In FIG. 4, solid line $\alpha$ is a rectangular wave representing a generated magnetic flux which is obtained by combining harmonics of all orders and a fundamental wave. Further, dashed line $\beta$ represents a fundamental wave magnetic flux of a generated magnetic flux, or, in other words, a first-order magnetic flux, and broken line $\gamma$ represents a second-order harmonic magnetic flux which is a harmonic of an order constituting a portion of a generated magnetic flux. As shown in FIG. 4, for the first stator 14 and the second stator 16, when the stator windings 22 are wound in concentrated winding, spacial harmonic magnetic fluxes of even-number orders are contained in large amount, and, in particular, a second-order spacial harmonic magnetic flux is contained in large amount, with respect to a fundamental wave of a magnetic flux produced by the stators 14 and 16. Such harmonic magnetic fluxes other than a fundamental wave cause an eddy current, which is an unwanted induced current, to occur when linked to the rotor 18, and cause secondary conductor loss such as copper loss to increase, or otherwise cause the performance of a rotating electrical machine to deteriorate. For this reason, it has been heretofore desired to suppress occurrence of harmonic magnetic fluxes linked to a rotor in an induction motor for generating an induced current from a magnetic flux generated by a stator.

To achieve this end, according to the present embodiment, the stator windings 22 having the same phase in the two stators 14 and 16 opposed to each other with the rotor 18 being interposed therebetween are arranged to be shifted by 180 degrees in electrical angle, as described above. As a result, as shown in FIG. 4, while fundamental waves of magnetic fluxes generated by the stators 14 and 16 have the same magnitude at the same phase in electrical angle, second-order harmonic magnetic fluxes which are not fundamental waves have the same magnitude but in opposite directions at the same electrical angle. Therefore, second-order harmonic magnetic fluxes, whose influence is particularly significant among magnetic fluxes originating from the first stator 14 and the second stator 16, can be made to compensate for each other at the rotor 18. As such, principally, only fundamental wave magnetic fluxes remain to be present in magnetic fluxes linked from the first stator 14 and the second stator 16 to the rotor 18, and it is possible to suppress a harmonic current being induced in the rotor 18 based on a harmonic magnetic flux. As a result, it is possible to reduce conductor loss such as copper loss caused by a harmonic current on the rotor 18 side and suppress heat generation in the rotor 18. Further, an improvement is achieved in performance of the rotating electrical machine 10 which is used as an induction motor.

Further, in contrast to the case of an induction motor described in the above-identified Patent Document 3, because the width of the stator windings 22 with respect to the circumferential direction of the stators 14 and 16 is not reduced, fundamental wave magnetic fluxes generated by the stators 14 and 16 are not reduced.

FIG. 5 shows results of calculations of outputs and losses in comparison among a rotating electrical machine having the structure of the present embodiment, which is a product according to the present invention, and a Comparative Example 1 and a Comparative Example 2 both having structures departing from the present invention, for verifying the advantages of the present embodiment. Comparative Example 1 is a conventional axial-type rotating electrical machine, or, more specifically, a rotating electrical machine in which only one stator is provided corresponding to one rotor, the rotor and the stator being opposed in the axial direction, and a stator winding provided in the stator is wound in distributed winding. Comparative Example 2 is also a conventional axial-type rotating electrical machine as described above, but in which a stator winding provided in the stator is wound in concentrated winding. Further, the results of calculations shown in FIG. 5 assume that the rotating electrical machine 10 has a constant slip, or, in other words, is at a "constant slip time".

FIG. 6 is a diagram for explaining the "constant slip time". In an induction motor, the rotational speed of a rotating magnetic field generated by the stators 14 and 16 does not synchronize with the rotational speed of the rotor 18 during operation. When the speed difference between the rotational speed of a rotating magnetic field and the rotational speed of the rotor 18 is defined as a "slip", a torque of the induction motor is generated corresponding to the "slip". The term "constant slip time" refers to cases where the "slip" is set to be constant, for example, where the "slip" in FIG. 6 is set to a constant value δ.

In FIG. 5, a diagonally hatched portion represents a secondary conductor loss such as a secondary copper loss, or, more specifically, a conductor loss occurring in the rotor 18, and a cross-hatched portion represents a primary conductor loss such as a primary copper loss, or, more specifically, a conductor loss occurring in the stators 14 and 16. Further, in FIG. 5, a sparsely shaded portion represents an output of the rotating electrical machine 10 which is used as an induction motor. As is clear from the results of calculations shown in FIG. 5, when the stator windings 22 of the rotating electrical machine 10 wound in distributed winding are replaced with those wound in concentrated winding, or, in other words, when Comparative Example 1 and Comparative Example 2 are compared, in Comparative Example 2, the secondary conductor loss is higher than in Comparative Example 1, and the output is correspondingly less because in Comparative Example 2, the amount of harmonic magnetic flux linked to the rotor 18 is higher than in Comparative Example 1, or for other reasons.

In contrast, in a product according to the present invention, as shown in FIG. 5, despite the fact that the stator windings 22 are wound in concentrated winding, the secondary conductor loss can be decreased. Both for this reason and because the two stators 14 and 16 are arranged on both sides of the rotor 18 so that fundamental wave magnetic fluxes originating from the two stators 14 and 16 cause magnetic fluxes linked to the rotor 18 to increase, the output of the rotating electrical machine 10 can be increased.

Second Embodiment of the Invention

Figure 7:
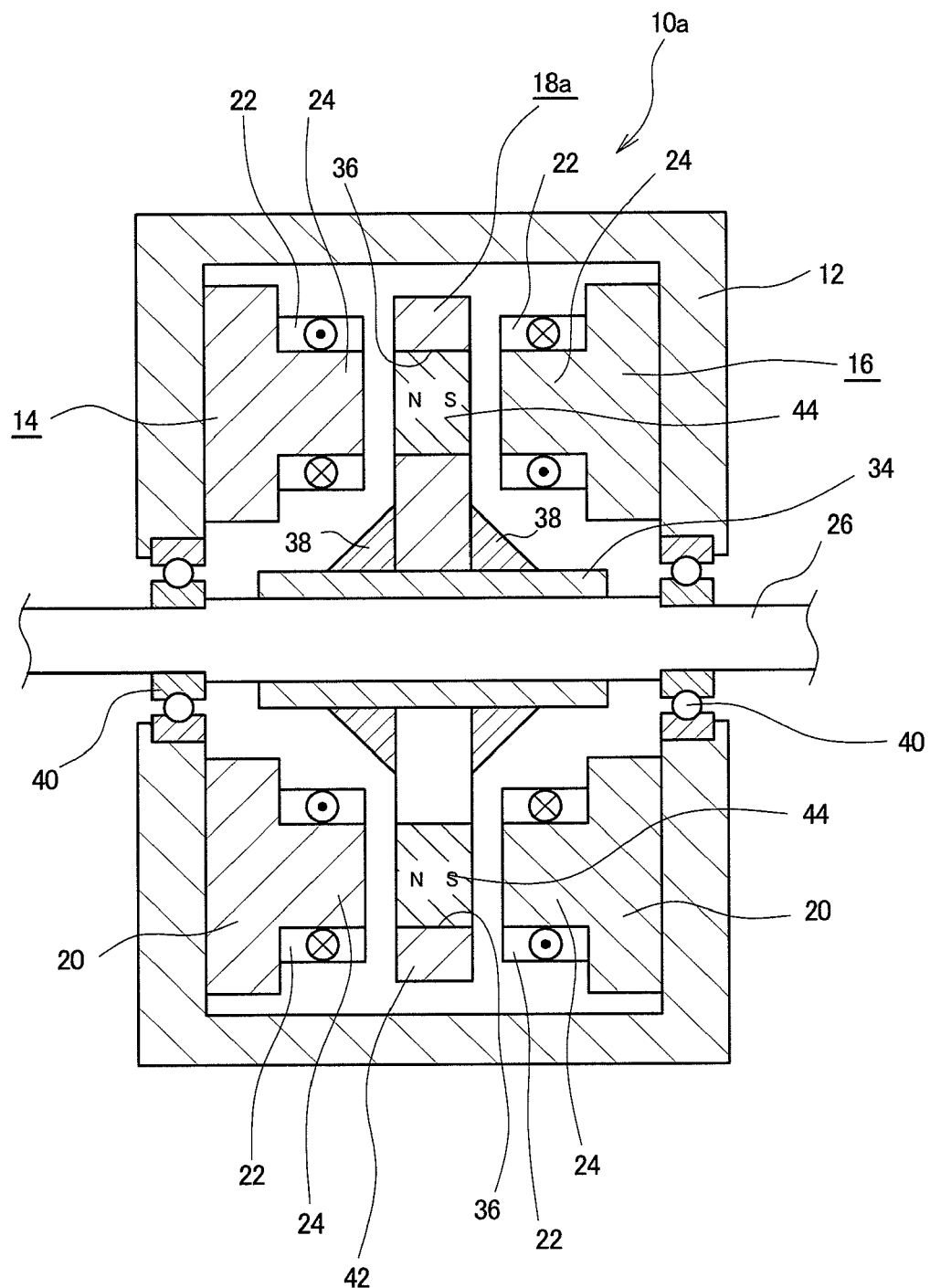
FIG. 7 is a schematic cross-sectional view showing a rotating electrical machine according to a second embodiment of the present invention.

FIG. 7 is a schematic cross-sectional view showing a rotating electrical machine according to a second embodiment of the present invention. A rotating electrical machine 10a according to the present embodiment is configured to be usable as a synchronous motor, which is a synchronous machine, and is similar to the above-described rotating electrical machine 10 according to the first embodiment shown in FIG. 1 to FIG. 6, but in which the rotor conductive body 28 (see FIG. 1) is not provided in a rotor 18a, and instead, a disk-shaped iron rotor core 42 having the same shape as the rotor conductive body 28 is provided. Further, the rotor cores 30 (see FIG. 1 and FIG. 2) provided in a plurality of portions in the circumferential direction of the rotor 18a in the above-described first embodiment are not provided, and instead, permanent magnets 44 are provided in a plurality of portions in the circumferential direction of the rotor 18a. The permanent magnets 44 are inserted in embedding hole portions 36 provided at evenly spaced positions in a plurality of portions in the circumferential direction of the rotor core 42 to pierce the rotor core 42 in the axial direction. The permanent magnets 44 are magnetized in the axial direction of the rotor 18a, and the directions of magnetization of permanent magnets 44 adjacent in the circumferential direction of the rotor 18a are different from each other. Therefore, the N poles and S poles of the permanent magnets 44 are alternately arranged with respect to the circumferential direction on each of the both side surfaces of the rotor 18a. Such permanent magnets 44 are provided in portions extending across the entire length in the axial direction of the rotor 18a. Further, the structure of the rotating electrical machine 10a except the rotor 18a is similar to the structure of the rotating electrical machine 10 according to the above-described first embodiment.

During use of the above-described rotating electrical machine 10a according to the present embodiment, by causing a three-phase alternating current to flow through the three-phase stator windings 22, the rotating magnetic fields produced by the first stator 14 and the second stator 16 act on the rotor 18a, and then the rotating magnetic fields and the magnetic fields produced by the permanent magnets 44 provided in the rotor 18a interact to cause attraction and repulsion to occur. As a result, the rotor 18a is driven to rotate in synchronization with the rotating magnetic fields produced by the stators 14 and 16. Further, by arranging the permanent magnets 44 in a plurality of portions in the circumferential direction of the rotor 18a, it is possible to provide magnetic salient poles in a plurality of portions in the circumferential direction of the rotor 18a, and the rotor 18a is also driven to rotate by means of reluctance torque produced by the magnetic salient poles.

Further, also in the present embodiment, two stators 14 and 16 are provided on both sides of one rotor 18a, the directions of magnetic fluxes generated by the two stators 14 and 16 are in the axial direction of the stators 14 and 16, and the stator windings 22 having the same phase in the two stators 14 and 16 are arranged to be shifted from each other by 180 degrees in electrical angle in the circumferential direction. As a result, spacial harmonic magnetic fluxes included in the magnetic fluxes generated by the two stators 14 and 16 can be made to compensate each other at the rotor 18a. Magnetic flux leakage or iron loss caused by an eddy current is reduced, and an improvement is achieved in performance of the rotating electrical machine 10a which is used as a synchronous motor.

In addition, because the width of each of the stator windings 22 with respect to the circumferential direction of the stators 14 and 16 is not reduced, fundamental wave magnetic fluxes generated by the stators 14 and 16 are not reduced.

Therefore, when the stator windings 22 are wound in concentrated winding, by reducing a magnetomotive force harmonic without reducing a fundamental wave magnetic flux generated by the stators 14 and 16, it is possible to reduce magnetic flux leakage or iron loss caused by spacial harmonic magnetic flux on the rotor 18a side, and, as a result, the performance of a rotating electrical machine 10a can be significantly improved. As the other structure and operation are similar to those in the above-described first embodiment, equivalent portions are denoted using the same reference numerals and the same description is not repeated here.

Third Embodiment of the Invention

Figure 8:
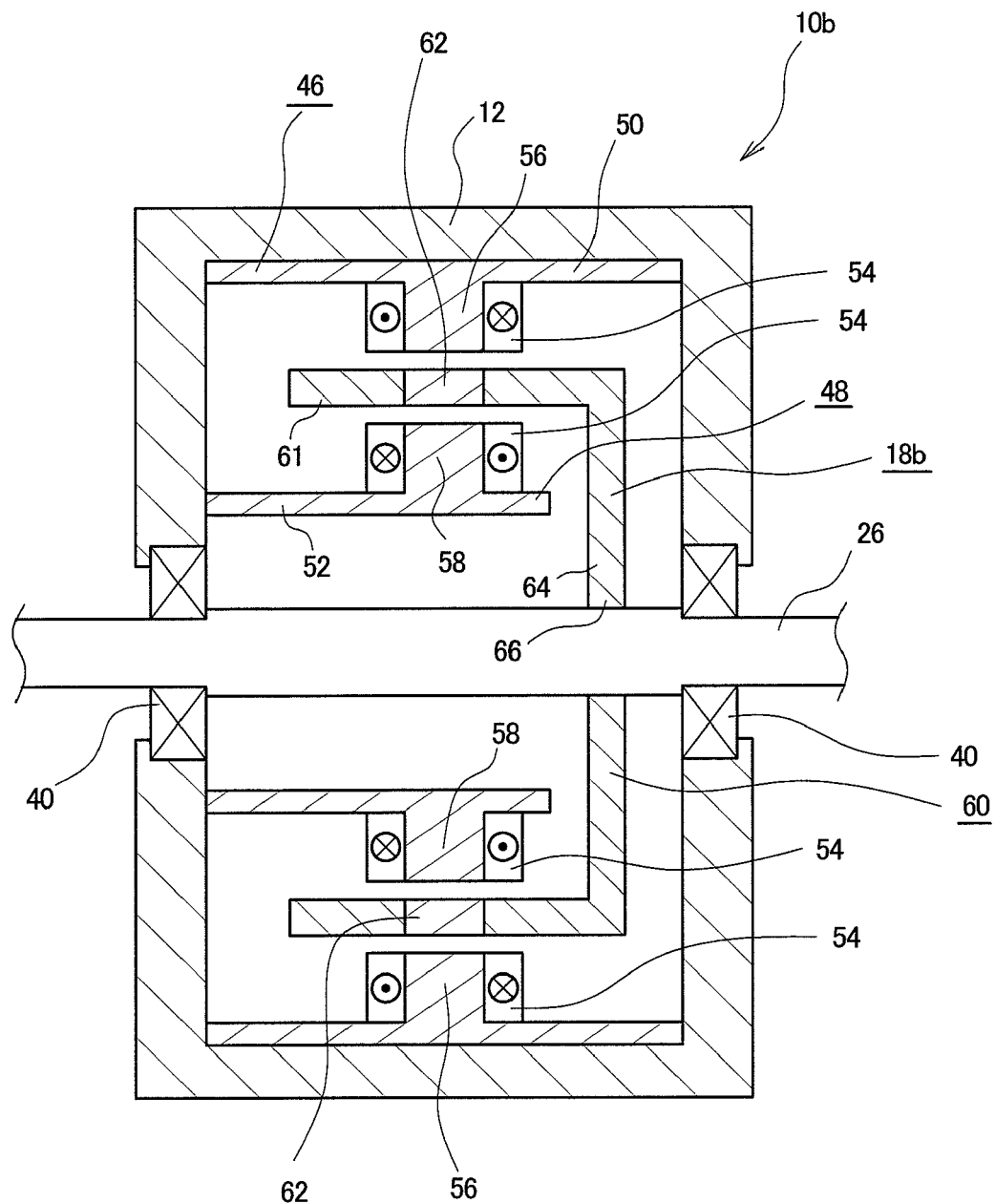
FIG. 8 is a schematic cross-sectional view showing a rotating electrical machine according to a third embodiment of the present invention.
Figure 9:
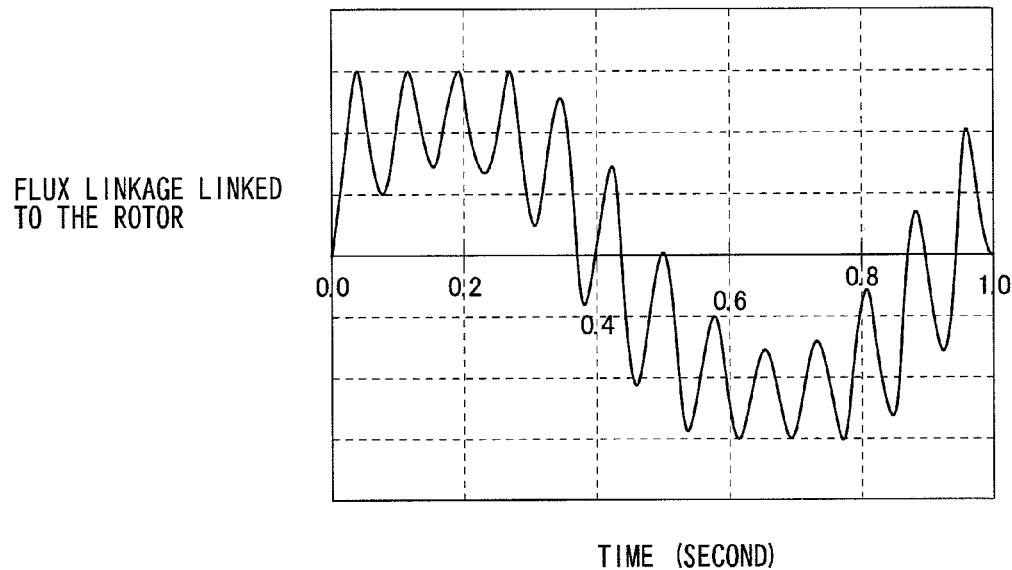
FIG. 9 shows a relationship of flux linkage originating from a stator and linked to a rotor with respect to time for a case where the stator winding, which is an armature winding of a conventional general induction motor, is wound in concentrated winding.
Figure 10:
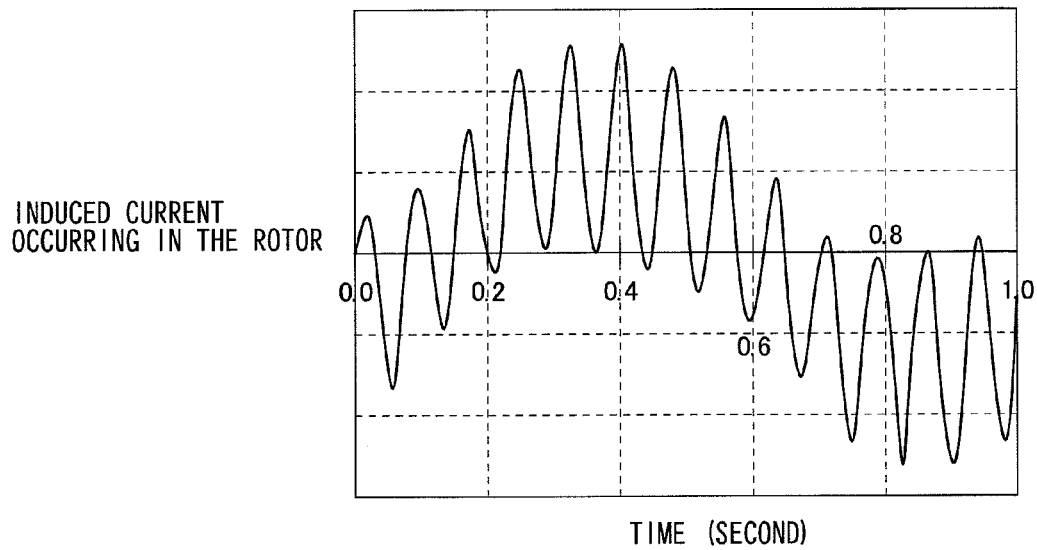
FIG. 10 shows a relationship of an induced current occurring in a rotor winding on the side of the rotor, which is a secondary side conductor, corresponding to the flux linkage shown in FIG. 9, with respect to time.

FIG. 8 is a schematic cross-sectional view showing a rotating electrical machine according to a third embodiment of the present invention. A rotating electrical machine 10b according to the present embodiment is configured to be usable as an induction motor, as in the first embodiment shown in FIG. 1 to FIG. 6 as described above. In particular, according to the present embodiment, two stators, an outer stator 46 serving as a first stator and an inner stator 48 serving as a second stator, are opposed in the radial direction with one rotor 18b being interposed therebetween. More specifically, the rotating electrical machine 10b according to the present embodiment is formed as a radial-type induction motor, in which the stators 46 and 48 and the rotor 18b are arranged to be opposed in the radial direction.

In more detail, in the rotating electrical machine 10b, the outer stator 46 having a cylindrical shape is attached to be fitted on an inner circumferential surface of a casing 12, and the inner stator 48 is attached on an inner surface of the casing 12 on one side in the axial direction in a state such that the inner stator 48 protrudes in the axial direction. A predetermined gap is provided in the radial direction between the outer stator 46 and the inner stator 48. Each of the stators 46 and 48 includes a stator core 50 or 52 formed by, for example, layering a plurality of flat rolled magnetic steel sheets, and stator windings 54 having a plurality of phases, or three phases of U-phase, V-phase, and W-phase. Teeth 56 and 58 are provided at evenly spaced positions in a plurality of portions in the circumferential direction on surfaces on one side in the radial direction on which the stator cores 50 and 52 are opposed to each other, such that the teeth 56 and 58 protrude in the radial direction. For example, in order to provide a plurality of teeth 56 or 58 on each stator core 50 or 52, it is possible to form hole portions in the radial direction in a plurality of portions in the circumferential direction of the stator core 50 or 52, and insert tooth components formed of a magnetic material such as a steel sheet into the hole portions, so that a plurality of teeth 56 or 58 are formed by portions of the tooth components which are protruded from a surface on one side of the stator core 50 or 52 in the radial direction.

The stator windings 54 are wound around the teeth 56 and 58. The stator windings 54 are wound in concentrated winding, in which windings of different phases are wound around teeth 56 or 58 adjacent in the circumferential direction in the plurality of teeth 56 or 58.

Further, the rotor 18b has a one-side closed cylindrical rotor conductive body 60, which is attached on outer side in radial direction in a middle portion in the axial direction of a rotating shaft 26, and rotor cores 62 formed of a magnetic material provided at evenly spaced positions in a plurality of portions in the circumferential direction of a tube portion 61 which forms the rotor conductive body 60. The rotor cores 62 are provided throughout the length in the radial direction of the tube portion 61 which forms the rotor conductive body 60.

Such a rotor 18b is attached by fitting a hole portion 66 provided in a base portion 64 which forms the rotor conductive body 60, on outer side in radial direction in a middle portion in the axial direction of the rotating shaft 26. In the outer stator 46 and the inner stator 48 provided on both sides of the rotor 18b in the radial direction, the directions of magnetic fluxes generated by the stator windings 54 having the same phase in the two stators 46 and 48 are in mutually opposite directions with respect to the radial direction. Further, the stator windings 54 having the same phase in the outer stator 46 and the inner stator 48 are arranged to be shifted from each other by 180 degrees in electrical angle in the circumferential direction. Additionally, for the two stators 46 and 48 shown in FIG. 8, the arrangement relationship of the stator windings 54 with respect to the circumferential direction does not represent an actual arrangement relationship; in an actual practical application the positions of the stator windings 54 with respect to the circumferential direction in the two stators 46 and 48 are shifted.

With such a structure according to the present embodiment, as in the above-described first embodiment shown in FIG. 1 to FIG. 6, when the stator windings 54 are wound in concentrated winding, it is also possible to significantly reduce secondary conductor loss such as secondary copper loss on the rotor 18b side by reducing a magnetomotive force harmonic without reducing a fundamental wave magnetic flux generated by the stators 46 and 48, and the performance of the rotating electrical machine 10b can be significantly improved. As the other structure and operation are similar to those in the above-described first embodiment, equivalent portions are denoted using the same reference numerals and the same description is not repeated here.

Further, while not shown in the drawings, a structure wherein the above-described second embodiment shown in FIG. 7 and the above-described third embodiment shown in FIG. 8 are combined may be adopted. More specifically, a structure similar to the above-described third embodiment shown in FIG. 8, in which the rotor conductive body 60 is replaced with an iron rotor core having the same shape, permanent magnets magnetized in the radial direction are arranged in place of the rotor cores 62 provided in a plurality of portions in the circumferential direction of the rotor conductive body 60, and the directions of magnetization of permanent magnets adjacent in the circumferential direction are opposite may be adopted.

Further, while not shown in the drawings, either a structure similar to the above-described second embodiment shown in FIG. 7, or a structure wherein the second embodiment and the third embodiment are combined, either in which permanent magnets 44 are not provided in the rotor 18a, or in which permanent magnets 44 are provided, and protrusions protruding either in the axial direction or in the radial direction are provided in a plurality of portions in the circumferential direction either on both side surfaces of the rotor 18a in the axial direction, or on both circumferential surfaces of the rotor in the radial direction, to increase the utilization ratio of reluctance torque in the rotating torque of the rotor 18a, may be adopted. Further, rotating electrical machines according to the above-described embodiments are not limited to those used as a motor, but may also be used as a generator.

The invention claimed is:

1. A rotating electrical machine comprising:
   one rotor; and
   two stators opposed with the rotor being interposed therebetween either on both sides of the rotor in an axial direction or on both sides of the rotor in a radial direction, wherein the two stators generate magnetic fluxes varying either in the axial direction or in the radial direction, wherein the stators are opposed to each other in either said axial direction or said radial direction, wherein each stator has teeth provided in a plurality of portions in a circumferential direction, and stator windings for a plurality of phases, said windings are primary conductors wound around the teeth, the stator windings are wound in concentrated winding, wherein said windings of different phases are wound around teeth adjacent in the circumferential direction in the plurality of teeth, directions of magnetic fluxes generated by stator windings having a same phase in the two stators are in mutually opposite directions with respect to either the axial direction or the radial direction, wherein the stators are opposed to each other in either said axial direction or said radial direction, and the stator windings having the same phase in the two stators are arranged to be shifted from each other by 180 degrees in electrical angle in the circumferential direction.

2. The rotating electrical machine according to claim 1, wherein a secondary conductor is provided in at least a portion of the rotor, and the rotating electrical machine is usable as an induction machine.

3. The rotating electrical machine according to claim 2, wherein the rotor has a conductive body formed of a conductive material, said conductive body is a secondary conductor, and cores formed of a magnetic material provided in a plurality of portions in the circumferential direction of the conductive body.

4. The rotating electrical machine according to claim 3, wherein an entire length of the conductive body in the axial direction is either same as an entire length of the cores in the axial direction, or greater than the entire length of the cores in the axial direction.

5. The rotating electrical machine according to claim 4, wherein the cores formed of the magnetic material are provided throughout the entire length of the conductive body in the axial direction, in hole portions provided in a plurality of portions in the circumferential direction of the conductive body to pierce the conductive body in the axial direction.

6. The rotating electrical machine according to claim 1, wherein the rotor has permanent magnets provided in a plurality of portions in the circumferential direction, and the rotating electrical machine is usable as a synchronous machine.

* * * * *